US008635106B2

(12) United States Patent
Sarukkai et al.

(10) Patent No.: US 8,635,106 B2
(45) Date of Patent: Jan. 21, 2014

(54) SYSTEM FOR TARGETING DATA TO USERS ON MOBILE DEVICES

(75) Inventors: Ramesh R. Sarukkai, Union City, CA (US); Subash Sundaresan, Fremont, CA (US); P. Sam Hamilton, Los Altos, CA (US); Shubhasheesh Anand, Mountain View, CA (US)

(73) Assignee: Yahoo! Inc., Sunnyvale, CA (US)

( * ) Notice: Subject to any disclaimer, the term of this patent is extended or adjusted under 35 U.S.C. 154(b) by 433 days.

(21) Appl. No.: 11/776,081

(22) Filed: Jul. 11, 2007

(65) Prior Publication Data

US 2009/0017805 A1 Jan. 15, 2009

(51) Int. Cl.
*G06Q 30/00* (2012.01)
(52) U.S. Cl.
USPC .......... 705/14.53; 455/414.1; 455/414.2; 455/414.3; 705/14.1; 705/14.25; 705/14.49; 705/14.64; 705/14.66
(58) Field of Classification Search
USPC .................................. 705/14.25, 14.53
See application file for complete search history.

(56) References Cited

U.S. PATENT DOCUMENTS

| | | | | |
|---|---|---|---|---|
| 6,009,409 | A | 12/1999 | Adler et al. | 705/14 |
| 6,026,368 | A | 2/2000 | Brown et al. | 705/14 |
| 6,047,310 | A | 4/2000 | Kamakura et al. | |
| 6,199,045 | B1 | 3/2001 | Giniger et al. | 705/1 |
| 6,205,193 | B1 | 3/2001 | Solve et al. | |
| 6,298,330 | B1 * | 10/2001 | Gardenswartz et al. | 705/14.25 |
| 6,334,108 | B1 * | 12/2001 | Deaton et al. | 705/14.13 |
| 6,343,317 | B1 | 1/2002 | Glorikian | 709/217 |
| 6,377,793 | B1 | 4/2002 | Jenkins | 455/456 |
| 6,381,465 | B1 | 4/2002 | Chern et al. | |

(Continued)

FOREIGN PATENT DOCUMENTS

| | | |
|---|---|---|
| JP | 1996-172495 A | 7/1996 |
| JP | 8172495 A | 7/1996 |

(Continued)

OTHER PUBLICATIONS

"CTIA: Smaato Introduces New Mobile Ad Solutions for Carriers: Advertising Delivery Support for Java Phones, Smartphones & Mobile Web; Launch of New Version of SOMA Mobile Advertising Platform," CTIA—San Francisco Moscone Center, Booth # 108, Oct. 23-25, 2007, 2 pages. Retrieved from http://www.smaato.com/download/pressarea/Smaato_CTIA_20071022_release.pdf.

(Continued)

*Primary Examiner* — Charles Appiah
*Assistant Examiner* — Mazda Sabouri
(74) *Attorney, Agent, or Firm* — Brinks Gilson & Lione

(57) ABSTRACT

A system is described for targeting data to users on mobile devices. The system may include a processor, a memory and an interface. The memory may be operatively connected to the processor and the interface and may store a request, a mobile identifier, a session identifier, a user behavior dataset and a data. The interface may be operatively connected to the memory and the processor and may communicate with the mobile device. The processor may be operatively connected to the interface and the memory and may receive a request from a user on a mobile device via the interface. The processor may extract a mobile identifier from the request and map the mobile identifier to a session identifier. The processor may use the session identifier to collect a user behavior dataset and may communicate data to the user based on the user behavior dataset via the interface.

22 Claims, 7 Drawing Sheets

(56) References Cited

U.S. PATENT DOCUMENTS

| | | | |
|---|---|---|---|
| 6,401,075 B1 | 6/2002 | Mason et al. | 705/14 |
| 6,480,713 B2 | 11/2002 | Jenkins | 455/456 |
| 6,510,515 B1 | 1/2003 | Raith | |
| 6,654,725 B1 | 11/2003 | Lengheinrich et al. | 705/14 |
| 6,681,107 B2 | 1/2004 | Jenkins et al. | 455/412.1 |
| 6,714,975 B1 | 3/2004 | Aggarwal et al. | 709/224 |
| 6,795,710 B1 | 9/2004 | Creemer | |
| 6,822,663 B2 | 11/2004 | Wang et al. | |
| 6,826,572 B2 | 11/2004 | Colace et al. | 707/10 |
| 6,907,566 B1 | 6/2005 | McElfresh et al. | 715/517 |
| 6,928,615 B1 | 8/2005 | Haitsuka et al. | 345/340 |
| 6,985,742 B1 | 1/2006 | Giniger et al. | 455/414.3 |
| 7,010,293 B2 | 3/2006 | Go | 455/414.3 |
| 7,043,483 B2 | 5/2006 | Colace et al. | 707/3 |
| 7,120,235 B2 | 10/2006 | Altberg et al. | |
| 7,136,661 B2 | 11/2006 | Graske et al. | |
| 7,200,853 B2 | 4/2007 | Kawai | |
| 7,277,718 B2 | 10/2007 | Wong | |
| 7,283,974 B2* | 10/2007 | Katz et al. | 705/26 |
| 7,363,024 B2 | 4/2008 | Jenkins | 455/412.1 |
| 7,487,112 B2 | 2/2009 | Barnes, Jr. | |
| 7,593,721 B2 | 9/2009 | Ratnakar | |
| 7,606,918 B2* | 10/2009 | Holzman et al. | 709/229 |
| 7,657,520 B2 | 2/2010 | Chen et al. | |
| 7,660,581 B2 | 2/2010 | Ramer et al. | |
| 7,729,945 B1 | 6/2010 | Katz et al. | |
| 7,801,892 B2 | 9/2010 | Lee et al. | |
| 2002/0010759 A1 | 1/2002 | Hitson et al. | |
| 2002/0046259 A1 | 4/2002 | Glorikian | 709/203 |
| 2002/0073034 A1 | 6/2002 | Wagner et al. | 705/51 |
| 2002/0077897 A1 | 6/2002 | Zellner et al. | |
| 2002/0078101 A1 | 6/2002 | Chang et al. | 707/516 |
| 2002/0083441 A1 | 6/2002 | Flickinger et al. | |
| 2002/0083442 A1 | 6/2002 | Eldering | |
| 2002/0128908 A1 | 9/2002 | Levin et al. | |
| 2002/0129137 A1 | 9/2002 | Mills et al. | |
| 2002/0161791 A1 | 10/2002 | Hanhikoski | |
| 2002/0164004 A1 | 11/2002 | Tamura et al. | |
| 2003/0046161 A1 | 3/2003 | Kamangar et al. | 705/14 |
| 2003/0055725 A1 | 3/2003 | Lee | |
| 2003/0149938 A1 | 8/2003 | McElfresh et al. | 715/517 |
| 2003/0154446 A1 | 8/2003 | Constant et al. | |
| 2004/0039733 A1 | 2/2004 | Soulanille | 707/3 |
| 2004/0044571 A1 | 3/2004 | Bronnimann et al. | |
| 2004/0054576 A1 | 3/2004 | Kanerva et al. | 709/206 |
| 2004/0088212 A1 | 5/2004 | Hill | |
| 2004/0093327 A1 | 5/2004 | Anderson et al. | 707/1 |
| 2004/0186776 A1 | 9/2004 | Llach | 709/200 |
| 2004/0194130 A1 | 9/2004 | Konig et al. | |
| 2005/0010477 A1 | 1/2005 | Sullivan et al. | 705/10 |
| 2005/0154746 A1 | 7/2005 | Liu et al. | 707/5 |
| 2005/0174975 A1 | 8/2005 | Mgrdechian et al. | 370/338 |
| 2005/0228797 A1 | 10/2005 | Koningstein et al. | |
| 2005/0289113 A1 | 12/2005 | Bookstaff | |
| 2006/0026069 A1 | 2/2006 | Mazurkiewicz et al. | |
| 2006/0041638 A1* | 2/2006 | Whittaker et al. | 709/219 |
| 2006/0085419 A1 | 4/2006 | Rosen et al. | 705/1 |
| 2006/0100928 A1 | 5/2006 | Walczak, Jr. et al. | |
| 2006/0116926 A1 | 6/2006 | Chen | |
| 2006/0149630 A1 | 7/2006 | Elliott et al. | 705/14 |
| 2006/0172697 A1 | 8/2006 | Gallego et al. | 455/522 |
| 2006/0184512 A1 | 8/2006 | Kohanim et al. | |
| 2006/0194572 A1 | 8/2006 | Fresonke et al. | 455/414.1 |
| 2006/0194595 A1 | 8/2006 | Myllynen et al. | 455/412.2 |
| 2006/0242013 A1 | 10/2006 | Agarwal et al. | |
| 2006/0271524 A1 | 11/2006 | Tanne et al. | |
| 2006/0282408 A1 | 12/2006 | Wisely et al. | |
| 2006/0288000 A1 | 12/2006 | Gupta | |
| 2007/0018952 A1 | 1/2007 | Arseneau et al. | |
| 2007/0027852 A1 | 2/2007 | Howard et al. | |
| 2007/0042754 A1 | 2/2007 | Bajikar et al. | |
| 2007/0061334 A1 | 3/2007 | Ramer et al. | |
| 2007/0088801 A1* | 4/2007 | Levkovitz et al. | 709/217 |
| 2007/0112739 A1 | 5/2007 | Burns et al. | |
| 2007/0121846 A1 | 5/2007 | Altberg et al. | |
| 2007/0174258 A1 | 7/2007 | Jones et al. | |
| 2007/0174490 A1 | 7/2007 | Choi et al. | 709/246 |
| 2007/0192318 A1 | 8/2007 | Ramer et al. | |
| 2007/0198339 A1 | 8/2007 | Shen et al. | |
| 2007/0213069 A1 | 9/2007 | Ji et al. | |
| 2007/0214043 A1 | 9/2007 | Yasuda | |
| 2007/0214048 A1 | 9/2007 | Chan et al. | |
| 2007/0233565 A1 | 10/2007 | Herzog et al. | |
| 2007/0233566 A1 | 10/2007 | Zlotin et al. | |
| 2007/0244750 A1* | 10/2007 | Grannan et al. | 705/14 |
| 2007/0264987 A1 | 11/2007 | Gupta et al. | |
| 2007/0288318 A1 | 12/2007 | Gupta et al. | |
| 2007/0294725 A1 | 12/2007 | Cohen et al. | |
| 2008/0032703 A1 | 2/2008 | Krumm et al. | |
| 2008/0221983 A1 | 9/2008 | Ausiannik et al. | |
| 2008/0256050 A1 | 10/2008 | Zhang et al. | |
| 2009/0049090 A1 | 2/2009 | Shenfield et al. | |

FOREIGN PATENT DOCUMENTS

| | | |
|---|---|---|
| JP | 2008-558303 | 12/2000 |
| JP | 2004-038367 A | 2/2004 |
| JP | 2005-251021 | 9/2005 |
| JP | 2005-300806 | 10/2005 |
| JP | 2008-558303 | 2/2006 |
| KR | 10-2000-0036964 A | 7/2000 |
| KR | 10-2001-0090958 | 10/2001 |
| KR | 10-2001-0097071 A | 11/2001 |
| KR | 10-2001-0102668 A | 11/2001 |
| KR | 10-2002-0000289 A | 1/2002 |
| KR | 10-2002-0065806 A | 8/2002 |
| KR | 2003-0026446 A | 4/2003 |
| KR | 10-2004-0099223 A | 11/2004 |
| KR | 10-2005-0097155 A | 10/2005 |
| KR | 2006-0004579 A | 1/2006 |
| KR | 2006-0028515 A | 3/2006 |
| KR | 2006-0062360 A | 6/2006 |
| KR | 10-2006-0127318 A | 12/2006 |
| KR | 10-0757757 B1 | 9/2007 |

OTHER PUBLICATIONS

"Strong Partners for Effective Mobile Advertising: Adconion Media Group and Smaato Enter Strategic Partnership," San Mateo / Munich, Germany—May 9, 2007, 2 pages. Retrieved from http://www.smaato.com/download/pressarea/Smaato_AMD_20070503_release.pdf.

"Smaato—Media / Developers," pp. 1-2, http://www.smaato.com/mo_mediadev.php, available at least as of Jan. 3, 2008.

"Smaato—Mobile Carriers," pp. 1-2, http://www.smaato.com/mo_carriers.php, available as least as of Jan. 3, 2008.

"Smaato—Mobile Marketing," pp. 1-2, http://www.smaato.com/mobile.php, available at least as of Jan. 3, 2008.

"ESME," *Wikipedia, the free encyclopedia*, p. 1, http://en.wikipedia.org/wiki/ESME, last modified Dec. 20, 2006, last visited Oct. 9, 2007.

"Network Switching Subsystem," *Wikipedia, the free encyclopedia*, pp. 1-6, http://en.wikipedia.org/wiki/Network_Switching_Subsystem, last modified Oct. 9, 2007, last visited Oct. 9, 2007.

"Short message service center," *Wikipedia, the free encyclopedia*, pp. 1-2, http://en.wikipedia.org/wiki/Short_message_service_center, last modified Sep. 11, 2007, last visited Oct. 9, 2007.

"Signal Transfer Point," *Wikipedia, the free encyclopedia*, p. 1, http://en.wikipedia.org/wiki/Signal_transfer_point, last modified Aug. 16, 2007, last visited Oct. 9, 2007.

"My First 6 Yahoo Panama 'Enhancement' Requests [Archive]", *Search Engine Watch Forums*, pp. 1-2, http://forums.searchenginewatch.com/archive/index.php/t-15882.html, containing posts from Jan. 18, 2007 to Jan. 25, 2007, last visited Apr. 23, 2008.

"Limbo Offers Purina Pet Lodown," *Adweek*, pp. 1-2, http://www.adweek.com/aw/iq_interactive/article_display.jsp?vnu_content_id=1003665626, dated Oct. 31, 2007, last visited Apr. 1, 2008.

"Short message service", *Wikipedia, the free encyclopedia*, pp. 1-5, http://en.wikipedia.org/wiki/Short_message_service, last visited Oct. 9, 2007.

(56) References Cited

OTHER PUBLICATIONS

Examiner's Answer to Appeal Brief mailed Oct. 21, 2010 for U.S. Appl. No. 11/830,406, 22 pages.
Final Office Action mailed Nov. 23, 2010 for U.S. Appl. No. 11/963,154, 19 pages.
Final Office Action mailed Sep. 7, 2010 for U.S. Appl. No. 12/165,175, 18 pages.
International Preliminary Report on Patentability dated Aug. 10, 2010 for corresponding International Application No. PCT/US2009/030196, 6 pages.
International Preliminary Report on Patentability dated Oct. 5, 2010 for corresponding International Application No. PCT/US2009/035657, 6 pages.
International Preliminary Report on Patentability dated Oct. 5, 2010 for corresponding International Application No. PCT/US2009/035662, 8 pages.
Notice of Allowance mailed Oct. 21, 2010 for U.S. Appl. No. 11/830,194, 9 pages.
Office Action dated Jul. 28, 2010 for corresponding Korean Application No. 10-2008-7021632, 11 pages.
Office Action mailed Dec. 10, 2010 for U.S. Appl. No. 11/963,082, 13 pages.
Office Action mailed Dec. 20, 2010 for U.S. Appl. No. 12/059,460, 10 pages.
Office Action mailed Jan. 21, 2011 for U.S. Appl. No. 12/180,782, 11 pages.
Office Action mailed Nov. 3, 2010 for U.S. Appl. No. 11/830,307, 17 pages.
Office Action mailed Oct. 20, 2010 for U.S. Appl. No. 11/963,029, 14 pages.
Office Action mailed Oct. 21, 2010 for U.S. Appl. No. 11/830,230, 19 pages.
Advisory Action mailed Feb. 14, 2011 for U.S. Appl. No. 11/963,154, 3 pages.
Examiner's Answer to Appeal Brief mailed Jan. 18, 2011 for U.S. Appl. No. 11/712,276, 16 pages.
International Preliminary Report on Patentability dated Feb. 1, 2011 for corresponding International Application No. PCT/US2009/049227, 7 pages.
Office Action mailed Feb. 16, 2011 for U.S. Appl. No. 12/059,421, 12 pages.
Final Office Action mailed Feb. 2, 2011 for U.S. Appl. No. 11/830,230, 18 pages.
Final Office Action mailed Feb. 3, 2011 for U.S. Appl. No. 11/963,029, 13 pages.
Final Office Action mailed Feb. 16, 2011 for U.S. Appl. No. 11/830,307, 17 pages.
Final Office Action mailed Feb. 17, 2011 for U.S. Appl. No. 12/026,522, 23 pages.
Final Office Action mailed Apr. 13, 2011 for U.S. Appl. No. 11/963,082, 13 pages.
Japanese Blog, printed from the internet at <http://halhal777.blog3.fc2.com/blog-entry-94.html> on Apr. 24, 2009, 12 pages.
Japanese Blog, printed from the internet at <http://k.hatena.ne.jp/keywordblog/jmobi> on Apr. 24, 2009, 3 pages.
Japanese Blog, printed from the internet at <http://blog.livedoor.jp/junpaku/archives/16328274.html on Apr. 24> 2009, 4 pages.
Japanese Blog, printed from the internet at <http://netanetaneta.seesaa.net/> on Apr. 24, 2009, 10 pages.
Japanese Blog, printed from the internet at <http://www.rc-seo.jp/000027.html> on Apr. 24, 2009, 2 pages.
Japanese Blog, printed from the internet at <http://www.cottonwool.jp/labo/jmobi.html> on Apr. 24, 2009, 3 pages.
Japanese Blog, printed from the internet at <http://www.googleadsense.seesaa.net/article/2238902.html> on Apr. 24, 2009, 3 pages.
Japanese Blog, printed from the internet at <http://vanillachips.net/archives/20050309_2336.php> on Apr. 24, 2009, 4 pages.
"Internet White Paper 2006," *Internet White Paper*, R&D, Tokyo, Japan, Jun. 21, 2006, 15 pages.

International Search Report and Written Opinion dated Aug. 16, 2007 for corresponding PCT Application No. PCT/US2007/005217, 9 pages.
International Search Report and Written Opinion of the International Searching Authority dated Jul. 27, 2009 for corresponding International Application No. PCT/US2009/030196, 7 pages.
International Search Report and Written Opinion of the International Searching Authority dated Jul. 31, 2009 for corresponding International Application No. PCT/US2009/035657, 7 pages.
International Search Report and Written Opinion of the International Searching Authority dated Aug. 31, 2009 for corresponding International Application No. PCT/US2009/035662, 9 pages.
International Search Report and Written Opinion of the International Searching Authority dated Feb. 17, 2010 for corresponding International Application No. PCT/US2009/049227, 8 pages.
International Search Report and Written Opinion of the International Searching Authority dated Feb. 18, 2009 for corresponding International Application No. PCT/US2008/067099, 7 pages.
International Search Report and Written Opinion of the International Searching Authority dated Jun. 30, 2009 for corresponding International Application No. PCT/US2008/084163, 7 pages.
International Search Report and Written Opinion of the International Searching Authority dated Jun. 24, 2009 for corresponding International Application No. PCT/US2008/084172, 7 pages.
International Search Report and Written Opinion of the International Searching Authority dated Jun. 24, 2009 for corresponding International Application No. PCT/US2008/084338, 8 pages.
International Preliminary Report on Patentability dated Sep. 9, 2008 for corresponding International Application No. PCT/US2007/005217, 6 pages.
International Preliminary Report on Patentability dated Jan. 12, 2010 for corresponding International Application No. PCT/US2008/067099, 5 pages.
International Preliminary Report on Patentability dated Jun. 22, 2010 for corresponding International Application No. PCT/US2008/084163, 5 pages.
International Preliminary Report on Patentability dated Jun. 22, 2010 for corresponding International Application No. PCT/US2008/084172, 5 pages.
International Preliminary Report on Patentability dated Jun. 22, 2010 for corresponding International Application No. PCT/US2008/084338, 6 pages.
STIC Search Report EIC 3600 dated Feb. 5, 2010; for U.S. Appl. No. 11/830,194, 86 pages.
Advisory Action mailed Aug. 3, 2010 for U.S. Appl. No. 11/712,276, 3 pages.
Supplemental Final Office Action mailed Apr. 30, 2010 for U.S. Appl. No. 11/712,276, 15 pages.
Final Office Action mailed Mar. 5, 2010 for U.S. Appl. No. 11/712,276, 13 pages.
Office Action mailed Sep. 10, 2009 for U.S. Appl. No. 11/712,276, 12 pages.
Final Office Action mailed Aug. 23, 2010 for U.S. Appl. No. 11/776,073, 17 pages.
Office Action mailed Apr. 30, 2010 for U.S. Appl. No. 11/776,073, 14 pages.
Office Action mailed Dec. 29, 2009 for U.S. Appl. No. 11/776,073, 13 pages.
Notice of Allowance mailed Feb. 17, 2010 for U.S. Appl. No. 11/830,194, 12 pages.
Office Action mailed Sep. 4, 2009 for U.S. Appl. No. 11/830,194, 14 pages.
Examiner's Answer to Appeal Brief mailed Aug. 30, 2010 for U.S. Appl. No. 11/830,344, 16 pages.
Advisory Action mailed May 3, 2010 for U.S. Appl. No. 11/830,344, 3 pages.
Final Office Action mailed Feb. 24, 2010 for U.S. Appl. No. 11/830,344, 15 pages.
Office Action mailed Sep. 11, 2009 for U.S. Appl. No. 11/830,344, 15 pages.
Advisory Action mailed May 27, 2010 for U.S. Appl. No. 11/830,406, 3 pages.

(56) References Cited

OTHER PUBLICATIONS

Final Office Action mailed Mar. 23, 2010 for U.S. Appl. No. 11/830,406, 14 pages.
Office Action mailed Sep. 14, 2009 for U.S. Appl. No. 11/830,406, 15 pages.
Examiner's Answer to Appeal Brief mailed Aug. 4, 2010 for U.S. Appl. No. 11/830,431, 11 pages.
Advisory Action mailed Apr. 16, 2010 for U.S. Appl. No. 11/830,431, 3 pages.
Final Office Action mailed Feb. 12, 2010 for U.S. Appl. No. 11/830,431, 11 pages.
Office Action mailed Sep. 9, 2009 for U.S. Appl. No. 11/830,431, 11 pages.
Office Action mailed Jun. 10, 2010 for U.S. Appl. No. 11/963,154, 11 pages.
Office Action mailed May 4, 2010 for U.S. Appl. No. 12/165,175, 21 pages.
Office Action mailed Aug. 20, 2010 for U.S. Appl. No. 12/026,522, 18 pages.
"Mobile Search Engines White Paper," Sonera MediaLab, 2002, 13 pages.
European Search Report dated Aug. 10, 2011 for corresponding European Application No. 7751948.6, 6 pages.
Final Office Action dated Jun. 21, 2011 for U.S. Appl. No. 12/059,421, 12 pages.
Final Office Action dated Jul. 6, 2011 for U.S. Appl. No. 12/180,782, 14 pages.
Final Office Action dated Jul. 15, 2011 for U.S. Appl. No. 12/059,460, 13 pages.
Final Office Action dated Nov. 3, 2011 for U.S. Appl. No. 12/059,386, 14 pages.
Final Office Action dated Nov. 23, 2011 for U.S. Appl. No. 12/059,325, 11 pages.
Office Action dated Jun. 28, 2011 for U.S. Appl. No. 12/059,386, 23 pages.
Office Action dated Aug. 15, 2011 for U.S. Appl. No. 12/059,325, 21 pages.
Office Action dated Sep. 23, 2011 for U.S. Appl. No. 11/963,154, 22 pages.
Office Action dated Sep. 28, 2011 for U.S. Appl. No. 12/975,041, 16 pages.
Office Action dated Dec. 29, 2011 for U.S. Appl. No. 11/830,230, 15 pages.
Office Action dated May 17, 2011 for corresponding Australian Application No. 2009232311.0, 3 pages.
Office Action dated Jan. 10, 2011 for corresponding Chinese Application No. 200780008231.5, 10 pages.
Office Action dated Jul. 13, 2011 for corresponding Chinese Application No. 200980103451.5, 11 pages.
Office Action dated Aug. 8, 2011 for corresponding Chinese Application No. 200880122228.0, 12 pages.
Office Action dated Oct. 3, 2011 for corresponding Japanese Application No. 2008-558303, 8 pages.
Office Action dated Aug. 30, 2011 for corresponding Korean Application No. 10-2010-7016222, 7 pages.
Office Action dated Sep. 16, 2011 for corresponding Korean Application No. 10-2010-7017411, 5 pages.
Translation of Examination Opinion dated Oct. 22, 2012 for corresponding Taiwan Application No. 97123462, 5 pages.

\* cited by examiner

SYSTEM FOR TARGETING DATA TO USERS ON MOBILE DEVICES

TECHNICAL FIELD

The present description relates generally to a system and method, generally referred to as a system, for targeting data to users on mobile devices, and more particularly, but not exclusively, to targeting advertisements to users on mobile devices based on the behavior of the users.

BACKGROUND

The mobile phone may be increasingly important as an information and content access device. Currently there may be over 2 billion mobile phones globally, versus 800 million personal computers. Mobile operators may be increasingly looking to high value data services as a way to overcome the continuing voice ARPU decline. Billions of dollars may be being spent globally on wireless licenses with billions more in investments in the pipeline for development of infrastructure and services by wireless service and content providers. Carriers may be introducing new data, content and multimedia services as a means of generating new revenue stream, reversing negative ARPU trends, retaining and attracting customers as well as increasing returns on investment, and extending and differentiating their service offering to consumers. The emergence of these wireless technologies may be creating unique opportunities for wireless carriers, advertisers and publishers to generate additional revenue streams through new and existing customers. As consumer adoption of wireless technology continues to increase, marketing via mobile devices may become an important part of all integrated data communications strategies.

Mobile marketing may benefit consumers, mobile service providers, publishers and advertisers by driving incremental revenue, enhancing consumer loyalty and providing convenience for mobile consumers. Mobile data acceptance may have arrived in many parts of the World and may be expected to increase. Mobile destination portals such as YAHOO! may monetize the mobile searches. However, there may be a low volume of behavioral data from users on mobile devices. The low volume of mobile user behavioral data may make it difficult for advertisers to efficiently target advertisements to mobile users.

SUMMARY

A system for targeting data to users on mobile devices may include a processor, an interface and a memory. The memory may be operatively connected to the processor and the interface and may store a request, a mobile identifier, a session identifier, a user behavior dataset and a data. The interface may be operatively connected to the memory and the processor and may communicate with the mobile device. The processor may be operatively connected to the interface and the memory and may receive a request from a user on a mobile device via the interface. The processor may extract a mobile identifier from the request and map the mobile identifier to a session identifier. The processor may use the session identifier to collect a user behavior dataset and may communicate data to the user based on the user behavior dataset via the interface.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

DETAILED DESCRIPTION

A system and method, generally referred to as a system, relate to targeting data to users on mobile devices, and more particularly, but not exclusively, to targeting advertisements to users on mobile devices based on the users' behavior on other platforms, such as the web or on a service provider partner. The principles described herein may be embodied in many different forms.

A system may parse a unique identifier from a mobile request to link a mobile user to a server side session identifier, such as a reference cookie. The system may then collect behavioral data from the user's interactions with the system. The behavioral data may be used in conjunction with a behavioral ad targeting system to target advertisements to the mobile user.

A system may link a mobile user's unique identifier to the user's identifier on other platforms, such as the traditional web or a partner's web site. The system may be able to create a link if the mobile user logs into an account established with the service provider through the traditional web. Once the user's behavior has been linked across more than one platform, the system may use an aggregate of the user's behavior across all of the platforms to target advertisements to the user on any of the individual platforms.

Figure 1:
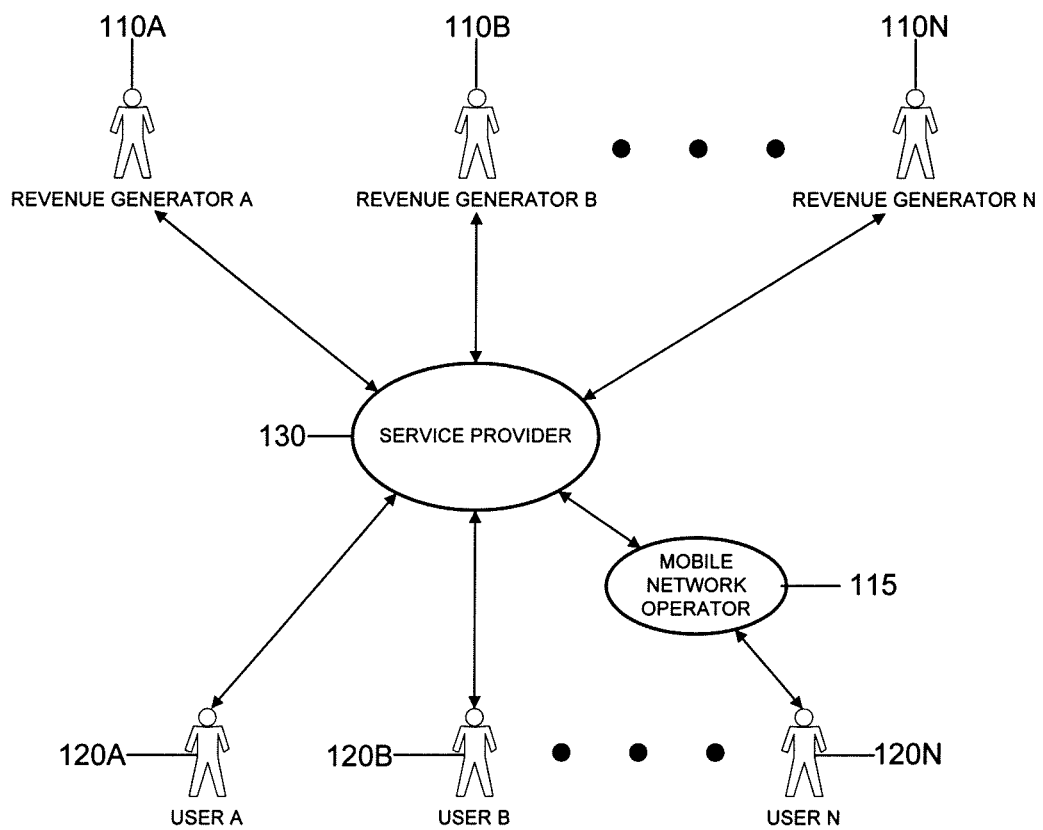
FIG. 1 is a block diagram of a system for targeting data to users on mobile devices.

FIG. 1 provides a general overview of a system 100 for targeting data to users on mobile devices. Not all of the depicted components may be required, however, and some implementations may include additional components. Variations in the arrangement and type of the components may be made without departing from the spirit or scope of the claims as set forth herein. Additional, different or fewer components may be provided.

The system 100 may include one or more revenue generators 110A-N, such as advertisers, a service provider 130, such as a search engine marketing service provider, a mobile network operator ("MNO") 115, and one or more users 120A-N, such as web surfers or mobile users. The service provider 130 may implement an advertising campaign management system incorporating an auction based and/or non-auction based advertisement serving system.

The revenue generators 110A-N may pay the service provider 130 to serve, or display, advertisements of their goods or services, such as on-line advertisements, over a network, such as the Internet or the mobile web. The advertisements may include sponsored listings, banners ads, popup advertisements, or generally any way of attracting the users 120A-N to the web site or mobile site of the revenue generators 110A-N. The users 120A-N may utilize the services of the service provider 130 through web applications, mobile applications or standalone applications.

The service provider 130 may maintain a mobile portal and/or a web portal, such as a search site, where the service provider 130 may display advertisements of the revenue generators 110A-N to the users 120A-N. In the case of a mobile portal, the service provider 130 may share revenue with the mobile network operator 115 of the user N 120N for displaying advertisements of the revenue generators 110A-N via their mobile networks, on mobile applications running on their mobile networks or as a part of a SMS message sent through their mobile network. Alternatively or in addition the service provider 130 may share revenue with individual publishers for displaying advertisements of the revenue generators 110A-N on their mobile and/or web sites.

The amount the revenue generators 110A-N may pay the service provider 130 may be based on one or more factors. These factors may include impressions, click throughs, conversions, and/or generally any metric relating to the advertisement and/or the behavior of the users 120A-N. The impressions may refer to the number of times an advertisement may have been displayed to the users 120A-N. The click throughs may refer to the number of times the users 120A-N may have clicked through an advertisement to a web site, mobile web site or mobile landing page of one of the revenue generators 110A-N, such as the revenue generator A 110A. The conversions may refer to the number of times a desired action was taken by the users 120A-N after clicking though to a web site of the revenue generator A 110A. The desired actions may include submitting a sales lead, making a purchase, viewing a key page of the site, downloading a whitepaper, and/or any other measurable action. If the desired action is making a purchase, then the revenue generator A 110A may pay the service provider 130 a percentage of the purchase.

The users 120A-N may be consumers of goods or services who may be searching for a business, such as the business of one of the revenue generators 110A-N. Alternatively or in addition the users 120A-N may be machines or other servers, such as the third party server 250. The users 120A-N may need a user identifier or identification ("user ID") to access the services of the service provider 130. In order to obtain a user ID the users 120A-N may need to supply information describing themselves to the service provider 130, such as the location, gender, or age of the users 120A-N, or generally any information that may be required for the users 120A-N to utilize the services provided by the service provider 130. The service provider 130 may collect user behavior data from the users 120A-N when they are logged in, such as queries searched for by the users 120A-N, links clicked on by the users 120A-N and/or any user interactions with the services provided by the service provider 130. The service provider 130 may also use cookies, such as a browser cookie, to collect user behavior data of users 120A-N who are not logged in or who are not otherwise identifiable.

The service provider 130 may serve advertisements to the users 120A-N relevant to the collected user behavior data. For example, if a user A 120A performed searches for sports topics, subscribed for sports alerts, or viewed sports related media or articles, the service provider server 130 may serve a sports related ad to the user A 120A. The revenue generators 110A-N may identify behavioral categories to associate their advertisements with, such as sports. Alternatively or in addition, the service provider server 130 may perform content matching on the advertisements of the revenue generators 110A-N and identified interests of the user A 120A, such as sports.

In the case of a mobile user N 120N, the service provider 130 may obtain information describing a mobile user from the mobile network operator 115 of the user N 120N. This information may include the telephone number of the mobile user N 120N, a unique set of characters defining the mobile user N 120N, a location of the mobile user N 120N, or generally any information that may describe the mobile user N 120N. The service provider 130 may map a mobile identifier of the mobile user N 120N, such as a unique set of characters, to a server-side reference cookie, such as a browser cookie. The service provider 130 may then collect user behavior data from the mobile user N 120N. If the mobile user N 120N accesses services of the service provider 130 through their user ID, the mobile identifier of the user N 120N may be linked to the user ID of the user N 120N. The service provider 130 may then use the user behavior data associated with the user ID of the user N 120N to target advertisements to the user N 120N over their mobile device. The user behavior data may include the information supplied by the mobile network operator 115.

The following examples may refer to a revenue generator A 110A as an online advertiser; however the system 100 may apply to any revenue generators 110A-N who may benefit from targeting data to mobile devices, such as a service provider partner. One example of a service provider partner may be a content publisher. Content publishers may be service provider partners who may display content, such as news articles, videos, or any other type of content to the users 120A-N. Along with the content, content publishers may display advertisements of the advertisers to the users 120A-N. The service provider 130 may supply the advertisements to the content publishers. The advertisements may relate to the content displayed on the page, or the advertisements may relate to the characteristics, demographics and/or login-profiles of the users 120A-N. When the users 120A-N interact with an advertisement of one of the advertisers, the advertisers may pay the service provider 130. The service provider 130 may in turn pay the content publisher. Thus the revenue generators 110A-N may include one or more content publishers, advertisers, and/or other service provider partners.

The service provider partners may provide the service provider 130 with information relating to the interactions of the users 120A-N with the service provider partners. In some instances the service provider partners may require the users 120A-N to obtain a user ID to access the services of the service provider partners. In order to obtain a user ID the users 120A-N may need to supply information describing themselves to the service provider partners, such as the location, gender, or age of the users 120A-N, or generally any information that may be required for the users 120A-N to utilize the services provided by the service provider partners. The service provider partners may share this information with the service provider 130. The service provider 130 may be able to match the login information of the users 120A-N on the service provider partners with the users 120A-N login information on the service provider 130. The service provider 130 may then be able to link the user IDs of the users 120A-N on the service provider partners with the user IDs of the users 120A-N on the service provider 130. The service provider 130 may then be able to link the user behavior data associated with the user IDs of the users 120A-N with behavior data of the users 120A-N supplied by the service provider partners.

Once the service provider 130 has linked one or more user interaction platforms, such as a mobile device, or a service provider partner, to the user ID of the user A 120A, the service provider 130 may aggregate the collected user behavior data across all of the platforms. The service provider 130 may then use the aggregated user behavior data to serve advertisements to the users 120A-N over any of the individual platforms, such as the web, mobile web, or on the web page of a service provider partner. The aggregation of user behavioral data may help to supplement an individual platform with a low volume of behavioral data, such as the mobile web.

More detail regarding the aspects of auction-based systems, as well as the structure, function and operation of the service provider 130, as mentioned above, can be found in commonly owned U.S. patent application Ser. No. 10/625,082, filed on Jul. 22, 2003, entitled, "TERM-BASED CONCEPT MARKET"; U.S. patent application Ser. No. 10/625,000, filed on Jul. 22, 2003, entitled, "CONCEPT VALUATION IN A TERM-BASED CONCEPT MARKET" filed on Jul. 22, 2003; U.S. patent application Ser. No. 10/625,001, filed on Jul. 22, 2003, entitled, "TERM-BASED CONCEPT INSTRUMENTS"; and U.S. patent application Ser. No. 11/489,386, filed on Jul. 18, 2006, entitled, "ARCHITECTURE FOR AN ADVERTISEMENT DELIVERY SYSTEM," all of which are hereby incorporated herein by reference in their entirety. The systems and methods herein associated with ad campaign management may be practiced in combination with methods and systems described in the above-identified patent applications incorporated by reference.

Figure 2:
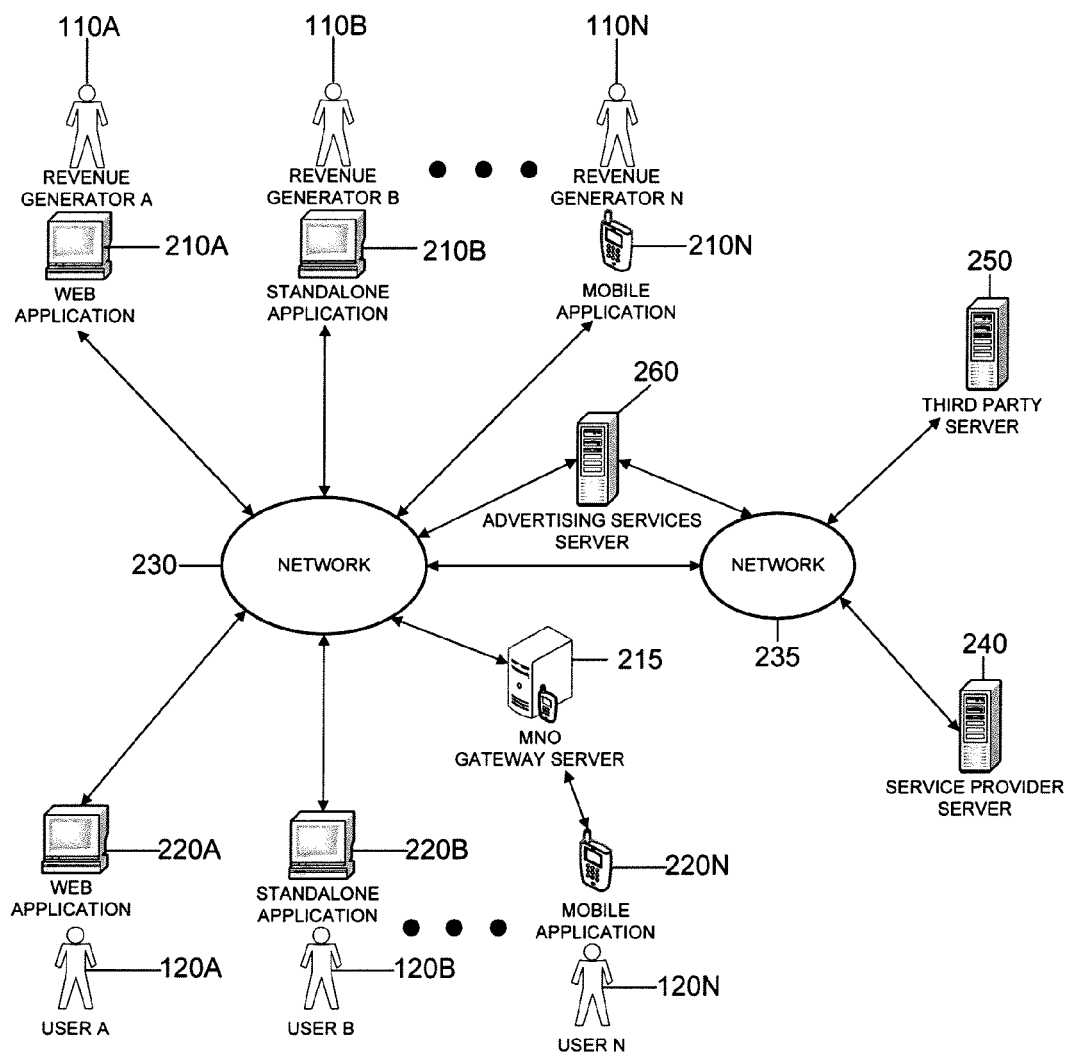
FIG. 2 is block diagram of a simplified view of a network environment implementing the system of FIG. 1 or other systems for targeting data to users on mobile devices.

FIG. 2 provides a simplified view of a network environment 200 implementing the system of FIG. 1 or other systems for targeting advertisements to users on mobile devices. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The network environment 200 may include one or more web applications, standalone applications and mobile applications 210A-N, which may be collectively or individually referred to as client applications for the revenue generators 110A-N. The system 200 may also include one or more web applications, standalone applications, mobile applications 220A-N, which may collectively be referred to as client applications for the users 120A-N, or individually as a user client application. The system 200 may also include one or more of a MNO gateway server 215, a network 230, a network 235, a service provider server 240, a third party server 250, and an advertising services server 260.

Some or all of the advertisement services server 260, service provider server 240, and third-party server 250 may be in communication with each other by way of network 235 and may be the system or components described below in FIG. 7. The advertisement services server 260, third-party server 250 and service provider server 240 may each represent multiple linked computing devices. Multiple distinct third party servers, such as the third-party server 250, may be included in the network environment 200. A portion or all of the advertisement services server 260 and/or the third-party server 250 may be a part of the service provider server 240. The third-party server 250 may be an MNO gateway server 215N or a server associated with, or in communication with an MNO gateway server 215N. Alternatively or in addition the third-party server 250 may be a service provider partner server or a content publisher server.

The networks 230, 235 may include wide area networks (WAN), such as the internet, local area networks (LAN), campus area networks, metropolitan area networks, or any other networks that may allow for data communication. The network 230 may include the Internet and may include all or part of network 235; network 235 may include all or part of network 230. The networks 230, 235 may be divided into sub-networks. The sub-networks may allow access to all of the other components connected to the networks 230, 235 in the system 200, or the sub-networks may restrict access between the components connected to the networks 230, 235. The network 235 may be regarded as a public or private network connection and may include, for example, a virtual private network or an encryption or other security mechanism employed over the public Internet, or the like.

The revenue generators 110A-N may use a web application 210A, standalone application 210B, or a mobile application 210N, or any combination thereof, to communicate to the service provider server 240, such as via the networks 230, 235. Similarly, the users 120A-N may use a web application 220A, a standalone application 220B, or a mobile application 220N to communicate to the service provider server 240, via the networks 230, 235. If the users 120A-N access the service provider server 240 via a mobile application 220N, the mobile application 220N may communicate through the MNO gateway server 215 to the service provider server 240.

The service provider server 240 may communicate to the revenue generators 110A-N via the networks 230, 235, through the web applications, standalone applications or mobile applications 210A-N. The service provider server 240 may also communicate to the users 120A-N via the networks 230, 235, and/or the MNO gateway server 215 through the web applications, standalone applications or mobile applications 220A-N.

The web applications, standalone applications and mobile applications 210A-N, 220A-N may be connected to the network 230 in any configuration that supports data transfer. This may include a data connection to the network 230 that may be wired or wireless. Any of the web applications, standalone applications and mobile applications 210A-N, 220A-N may individually be referred to as a client application. The web applications 210A, 220A may run on any platform that supports web content, such as a web browser or a computer, a mobile phone, personal digital assistant (PDA), pager, network-enabled television, digital video recorder, such as TIVO®, automobile and/or any appliance capable of data communications.

The standalone applications 210B, 220B may run on a machine that may have a processor, memory, a display, a user interface and a communication interface. The processor may be operatively connected to the memory, display and the interfaces and may perform tasks at the request of the standalone applications 210B, 220B or the underlying operating system. The memory may be capable of storing data. The display may be operatively connected to the memory and the processor and may be capable of displaying information to the revenue generator B 110B or the user B 120B. The user interface may be operatively connected to the memory, the processor, and the display and may be capable of interacting with a user A 120A or a revenue generator A 110A. The communication interface may be operatively connected to the memory, and the processor, and may be capable of communicating through the networks 230, 235 with the service provider server 240, third party server 250 and advertising services server 260. The standalone applications 210B, 220B may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The mobile applications 210N, 220N may run on any mobile device which may have a data connection. The mobile applications 210N, 220N may be a web application 210A, a standalone application 210B, or a mobile browser. The mobile device may be one of a broad range of electronic devices which may include mobile phones, PDAs, and laptops and notebook computers. The mobile device may have a reduced feature set, such as a smaller keyboard and/or screen, and may be incapable of supporting a traditional web search.

The data connection of the mobile device may be a cellular connection, such as a GSM/GPRS/WCDMA connection, a wireless data connection, an internet connection, an infra-red connection, a Bluetooth connection, or any other connection capable of transmitting data. The data connection may be used to connect directly to the network 230, or to connect to the network 230 through the MNO gateway server 215. The MNO gateway server 215 may control the access the mobile applications 210N, 220N may have to the network. The MNO gateway server 215 may also control the technology supporting the respective mobile applications 210N, 220N. This may affect all aspects of the user experience, such as signal strength and availability, speed and billing mechanisms. For example, the MNO gateway server 215 may only allow the users N 120N access to content provided by partners of the MNO. Furthermore, the MNO gateway server 215 may only allow users 120N access to data in a specific format, such as WML, XHTML, NTT DOCOMO IMODE HTML, or cHTML. Alternatively or in addition, the mobile applications 220N may only support one of the aforementioned formats.

The service provider server 240 may include one or more of the following: an application server, a data store, a database server, a middleware server, and an advertising services server. One middleware server may be a mobile commerce platform, such as the YAHOO! SUSHI platform, which may properly encode data, such as mobile pages or mobile advertisements, to the formats specific to the MNO gateway server 215. The service provider server 240 may co-exist on one machine or may be running in a distributed configuration on one or more machines. The service provider server 240 may collectively be referred to as the server. The service provider may implement a search engine marketing system and/or an advertising campaign management system. The service provider server 240 may receive requests from the users 120A-N and the revenue generators 110A-N and may serve web pages or mobile pages to the users 120A-N and the revenue generators 110A-N based on their requests.

The third party server 250 may include one or more of the following: an application server, a data source, such as a database server, a middleware server, and an advertising services server. The third party server may implement a relevancy engine, a context matching engine, or any other third party application that may be used in a search engine marketing system and/or an advertising campaign management system. The third party server 250 may co-exist on one machine or may be running in a distributed configuration on one or more machines. The third party server 250 may receive requests from the users 120A-N and the revenue generators 110A-N and may serve pages to the users 120A-N and the revenue generators 110A-N based on their requests.

The advertising services server 260 may provide a platform for the inclusion of advertisements in pages, such as web pages. The advertisement services server 260 may be used for providing advertisements that may be displayed to the users 120A-N. The advertising services server 260 may implement a search engine marketing system and/or an advertising campaign management system The service provider server 240, the third party server 250, the advertising services server 260, the mobile devices, and the MNO gateway server 215 may be one or more computing devices of various kinds, such as the computing device in FIG. 7. Such computing devices may generally include any device that may be configured to perform computation and that may be capable of sending and receiving data communications by way of one or more wired and/or wireless communication interfaces. Such devices may be configured to communicate in accordance with any of a variety of network protocols, including but not limited to protocols within the Transmission Control Protocol/Internet Protocol (TCP/IP) protocol suite. For example, the web applications 210A, 210A may employ HTTP to request information, such as a web page, from a web server, which may be a process executing on the service provider server 240 or the third-party server 250.

There may be several configurations of database servers, application servers, middleware servers and advertising services servers included in the service provider server 240, or the third party server 250. Database servers may include MICROSOFT SQL SERVER®, ORACLE®, IBM DB2® or any other database software, relational or otherwise. The application server may be APACHE TOMCAT®, MICROSOFT IIS®, ADOBE COLDFUSION®, YAPACHE® or any other application server that supports communication protocols. The middleware server may be any middleware that connects software components or applications. The middleware server may be a relevancy engine, a context matching engine, or any other middleware that may be used in a search engine marketing system and/or an advertising campaign management system.

The application server on the service provider server 240 or the third party server 250 may serve pages, such as web pages or mobile web pages to the users 120A-N and the revenue generators 110A-N. The advertising services server 260 may provide a platform for the inclusion of advertisements in pages, such as web pages or mobile web pages. The advertising services server 260 may also exist independent of the service provider server 240 and the third party server 250.

The networks 230, 235 may be configured to couple one computing device to another computing device to enable communication of data between the devices. The networks 230, 235 may generally be enabled to employ any form of machine-readable media for communicating information from one device to another. Each of networks 230, 235 may include one or more of a wireless network, a wired network, a local area network (LAN), a wide area network (WAN), a direct connection such as through a Universal Serial Bus (USB) port, and the like, and may include the set of interconnected networks that make up the Internet. The networks 230, 235 may include any communication method by which information may travel between computing devices.

Figure 3:
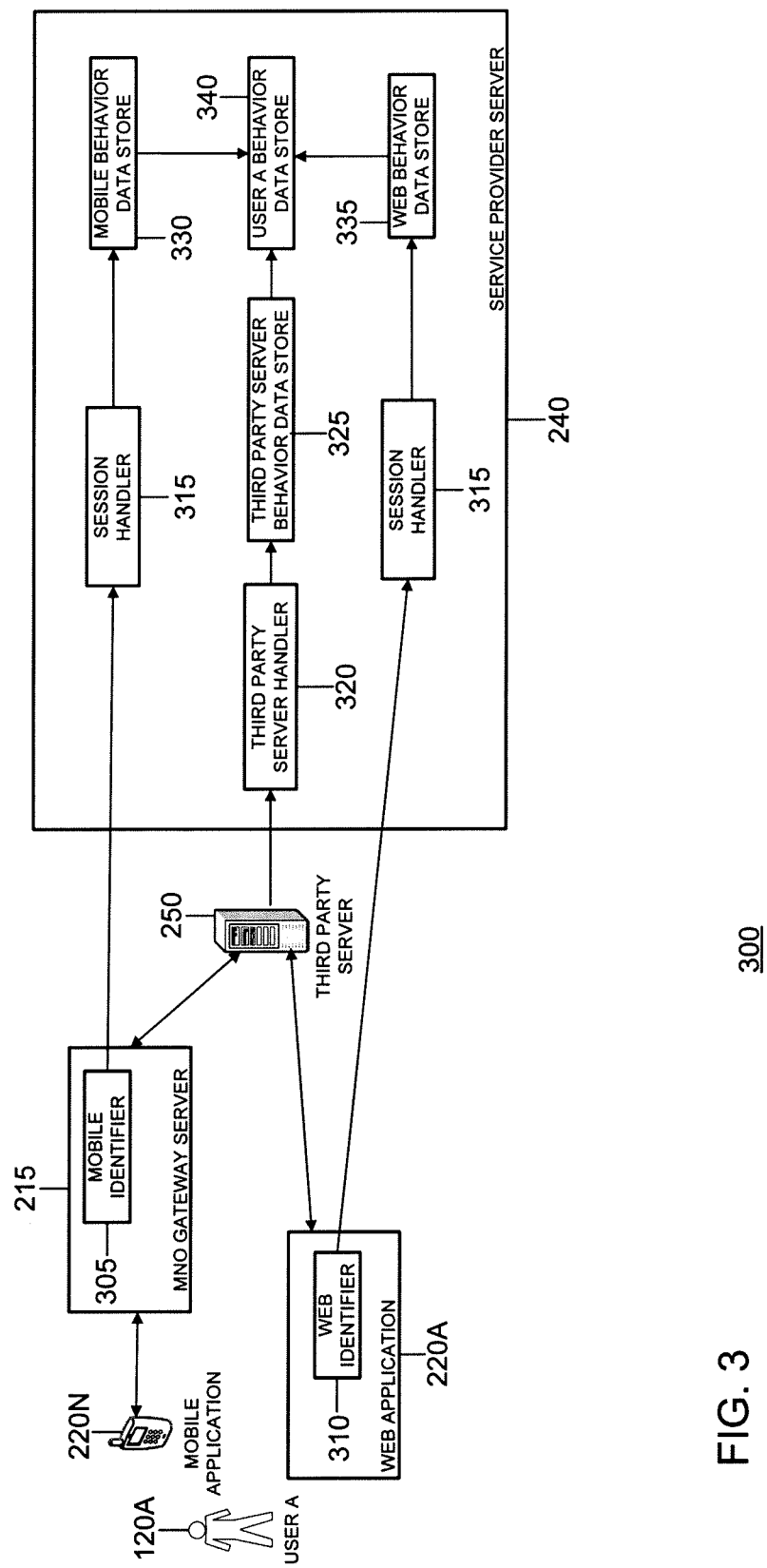
FIG. 3 is a block diagram illustrating linking user behavioral data across multiple platforms in the system of FIG. 1 or other systems for targeting data to users on mobile devices.

FIG. 3 illustrates a system 300 for linking user behavioral data across platforms in the system of FIG. 1 or other systems for targeting advertisements to users on mobile devices. Not all of the depicted components may be required, however, and some implementations may include additional components not shown in the figure. Variations in the arrangement and type of the components may be made without departing from the spirit or scope of the claims as set forth herein. Additional, different or fewer components may be provided.

The system 300 may include a user A 120A, a web application 220A, a mobile application 220N, an MNO gateway server 215, a third party server 250, and a service provider server 240. The MNO gateway server 215 may identify a mobile user identifier 305, and may communicate the mobile user identifier 305 to the service provider server 240. The web application 220A may store a web user identifier 310 that may be communicated to the service provider server 240. The service provider server 240 may include one or more session handlers 315 which may identify the sessions of the current users 120A-N, a third party server handler 320, a third party server behavior data store 325, a mobile behavior data store 330, a web behavior data store 335 and a user A behavior data store 340. The data stores may exists as tables in a database or may be stored in separate data sources.

In operation the user A 120A may use the mobile application 220N and/or the web application 220A to access the services of the service provider server 240 or a third party server 250, such as a service provider partner. The user may access the web application 220A through a web browser. When the user A 120A first interacts with the service provider server 240 through the web application 220A, the service provider server 240 may use a web user identifier 310, such as a cookie, to identify the user A 120A. Web user identifier 310 may be stored on the system running the web application 220A and may be communicated to the service provider server 240 when the user A 120A interacts with the service provider server 240. The web user identifier 310 may be linked, or mapped by the session handler 315 on the service provider server 240 side. The session handler 315 may be a cookie handler or identifier that may link the web user identifier 310 to an identifier on the service provider server 240 side, such as a cookie or a data field.

When the user A 120A interacts with the service provider server 240 via the web application 220A, the session handler 315 may identify the user A 120A by the web user identifier 310 and may store data describing the interactions in the web behavior data store 335. The data may describe the behavior of the user A 120A when the user A 120A interacts with any of the properties of the service provider 130. If the user A 120A use a user ID to log into a service of the service provider server 240, such as email, the service provider server 240 may link the user ID of the user A 120A to the web user identifier 310. In this case the web behavior data may be merged into the user A behavior data store 340. The user A behavior data store 340 may store any behavioral data that can be linked to the user A 120A.

The user A 120A may also access services of the service provider 130 via a mobile application 220N. The user A 120A may access a mobile application 220N through a mobile device. When a user A 120A accesses the services of the service provider 130 through a mobile application 220N, the connection may be routed through a MNO gateway server 215. The MNO gateway server 215 may determine a unique mobile identifier 305 for the mobile device, such as the ASID (anonymous subscriber ID) of the user A 120A, the ESN (Electronic Serial Number) of the device, the MEID (Mobile Equipment Identifier) of the device, the phone number associated with the device, or generally any unique set of characters that may identify the user A 120A or the mobile device. The MNO gateway server 215 may append or otherwise attach the mobile identifier 305 of the user A 120A or the mobile device, to the mobile request of the user A 120A. Alternatively or in addition the mobile device of the user A 120A may append the mobile identifier 305 to the mobile request. The MNO gateway server 215 may then forward the request to the service provider server 240. Alternatively or in addition, the MNO gateway server 215 may share additional information about the user A 120A or about the behavior of the user A 120A to the service provider server 240. The service provider server 240 may store this information in the mobile behavior data store 330.

The mobile identifier 305 may be linked or mapped by a session handler 315 on the service provider server 240 side. The session handler 315 may be a cookie handler or identifier that may link the mobile identifier 305 to an identifier on the service provider server 240 side, such as a cookie or a data field.

When the user A 120A interacts with the service provider server 240 via the mobile application 220N, the session handler 315 may identify the user A 120A by the mobile identifier 305 and may store data describing mobile interactions with the user A 120A in the mobile behavior data store 325. The data may describe the behavior of the user when interacting with any of the mobile properties of the service provider server 240, such as a mobile search engine. If the user A 120A uses a user ID to log into a mobile service of the service provider server 240, such as mobile email, the service provider server 240 may link the mobile identifier 305 to the user ID of the user A 120A. In this case the mobile behavior data may be merged into the user A behavior data store 340. Thus, the user A behavior data store 335 may store an aggregation of the behavior of the user A 120A on the web and on the mobile web. The service provider server 240 may then use the aggregation of data to more efficiently target advertisements to the user A 120A via the mobile application 220N and/or the web application 220A.

Alternatively or in addition, the service provider server 240 may be able to mine information supplied by the user A 120A to link the mobile identifier 305 to the account of the user A 120A. For example, the user A 120A may have supplied their mobile phone number, such as to receive text message alerts, to the service provider server 240. If the service provider server 240 received a mobile phone number of the mobile identifier 305 from the MNO gateway server 215, the service provider server 240 may be able to link the mobile identifier 305 to the user ID of the user A 120A based on the mobile phone number.

The user A 120A may interact with the third party server 250, such as a service provider partner, through either the mobile application 220N or the web application 220A. The service provider partner may require that the user A 120A obtain a user ID to utilize the services of the service provider partner. The process of obtaining a login may require that the user A 120A submit personal information, such as a home address, date of birth, or a credit card number. The third party server 250 may communicate some or all of the information provided by the user A 120A, and data describing the behavior of the user A 120A, to the service provider server 240. The third party server handler 320 may store the data in the third party server behavior data store 325. The service provider 240 may use the data in the third party server behavior data store 325 to provide relevant advertisements to the service provider partner to display to the user A 120A.

The service provider server 240 may be able to link the information associated with the user ID of the user A 120A on the service provider partner to the information associated with the user ID of the user A 120A on the service provider server 240. In this instance the third party server behavior may be merged into the user A behavior data store 340. Thus, the user A behavior data store 335 may store an aggregation of the behavior of the user A 120A on the web, the behavior of the user A 120A on the mobile web, and the behavior of the user A 120A on one or more service provider partners. The service provider server 240 may then use the aggregation of data to more efficiently target advertisements to the user A 120A via any of the mobile application 220N, the web application 220A, and/or via the one or more service provider partners.

Figure 4:
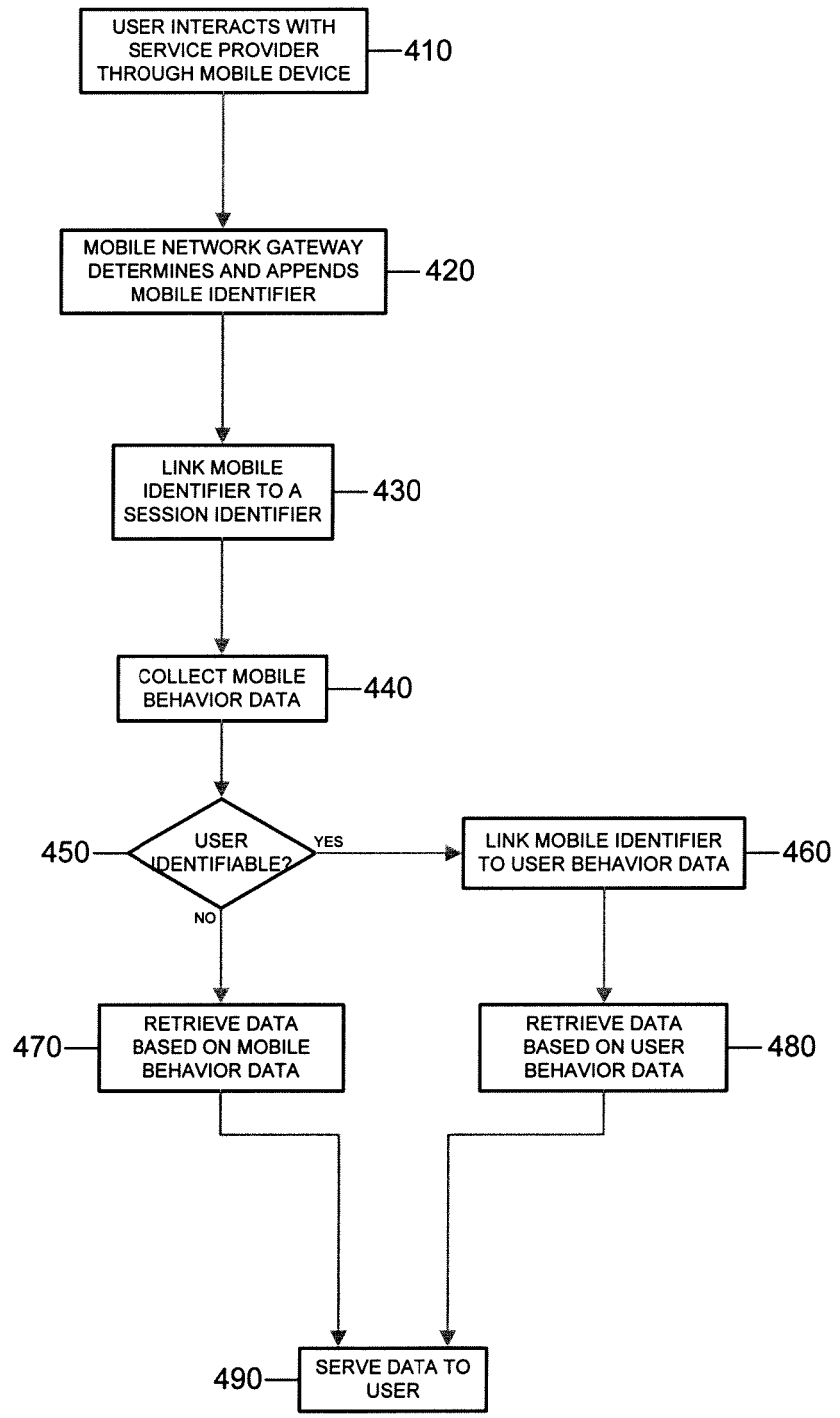
FIG. 4 is a flowchart illustrating the operations of the system of FIG. 1 or other systems for targeting data to users on mobile devices.

FIG. 4 is a flowchart illustrating the operations of the system of FIG. 1, or other systems for targeting advertisements to users on mobile devices. At block 410 one of the users 120A-N, such as the user A 120A, may interact with the service provider 130 through a mobile device. The communication may be routed through an MNO gateway server 215. At block 420 the MNO gateway server 215 may determine a mobile identifier 305, capable of identifying the user A 120A or the mobile device of the user A 120A, and may append the mobile identifier 305 to the mobile request. The mobile identifier 305 may be the mobile phone number of the mobile device, or any other set of characters capable of identifying the user A 120A or the mobile device. The mobile network operator may also supply the service provider 130 with additional information about the user A 120A. Alternatively or in addition the mobile device or the mobile application 220N may append the mobile identifier 305 to the mobile request, such as in the header of the request. The MNO gateway server 215 may then forward the mobile request to the service provider server 240.

At block 430 the service provider server 240 may receive the mobile request, parse the mobile identifier 305 and link the mobile identifier 305 to a session identifier, such as a cookie. The session identifier may be assigned by the session handler 315. At block 440 the service provider server 240 may use the linked mobile identifier 305 to collect data originating from the mobile device of the user A 120A. The data may be behavioral data that may describe the interests of the user A 120A. At block 450 the service provider server 240 may determine any user behavior data has been collected which may be capable of identifying the user A 120A, such as through the user ID of the user A 120A. The user A 120A may be identifiable if the user A 120A uses a user ID to log into a service of the service provider 240, such as an email service. Alternatively or in addition, the user A 120A may be identifiable based on the phone number of the mobile device. In this case the MNO gateway server 215 may communicate the mobile phone number of the mobile device to the service provider server 240. In addition the user A 120A may have supplied their mobile number in association with their user ID, such as to receive text message alerts. The service provider server 240 may then use the mobile phone number to link the mobile device to the user ID of the user A 120A.

If the user is identifiable, the system 100 may move to block 460. At block 460 the service provider server 240 may link the mobile identifier 305 of the user A 120A to the user ID of the user A 120A, and thus the historical user behavior data associated with the user A 120A. The linked mobile identifier 305 may provide the service provider 240 with the ability to collect mobile user behavior data from the user A 120A even when the user A 120A has not used their user ID. When the mobile identifier 305 is linked to the user behavior data, the collected behavior data associated with the mobile identifier 305 may be merged with the behavior data associated with the user ID of the user A 120A. At block 480 the service provider 240 may retrieve data, such as an advertisement, based on the combined user behavior data, such as through behavioral targeting. At block 490 the service provider server 240 may serve the data, such as an advertisement, to the mobile device of the user A 120A.

If the user is not identifiable at block 450, the system 100 may move to block 470. At block 470 the service provider 240 may retrieve data, such as an advertisement, based only on the user behavior data collected via the mobile identifier 305. The volume of data collected via the mobile identifier 305 may be less than the combined volume of data from mobile interactions, web interactions, and/or service provider partner interactions. At block 490 the service provider server 240 may serve the data, such as an advertisement, to the mobile device of the user A 120A.

Figure 5:
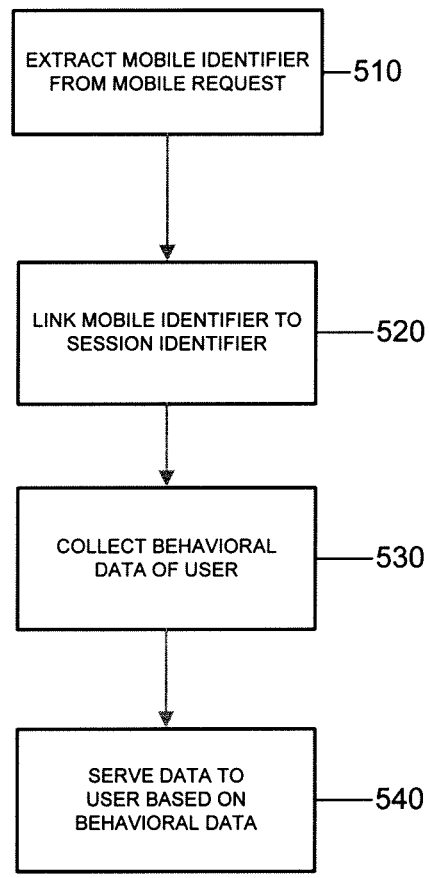
FIG. 5 is a flowchart illustrating the server-side operations of the system of FIG. 1, or other systems for targeting data to users on mobile devices.

FIG. 5 is a flowchart illustrating the server-side operations of the system of FIG. 1, or other systems for targeting data to users on mobile devices. At block 510 the service provider server 240 may extract a mobile identifier 305 from a mobile request. The mobile identifier 305 may be the mobile telephone number, a hash of the mobile telephone number, or generally any unique set of characters capable of identifying a particular user A 120A or mobile device.

At block 520 the service provider server 240 may link the mobile identifier 305 to a server side session identifier, such as a cookie. By linking the mobile identifier 305 to a session identifier, the service provider server 240 may be able to utilize web based ad serving and behavioral targeting systems in a mobile context. At block 530 the service provider server 240 may use the existing systems to track the behavior of the user A 120A, such as by storing data pertaining to mobile interactions with the user A 120A.

At block 540 the service provider server 240 may serve data, such as an advertisement to the user A 120A based on the collected behavioral data. The advertisement may be selected and served by web ad serving or behavior targeting systems. The advertisement may be served with content on a mobile page, in response to a mobile search request or attached to a SMS to the mobile device of the user A 120A.

Figure 6:
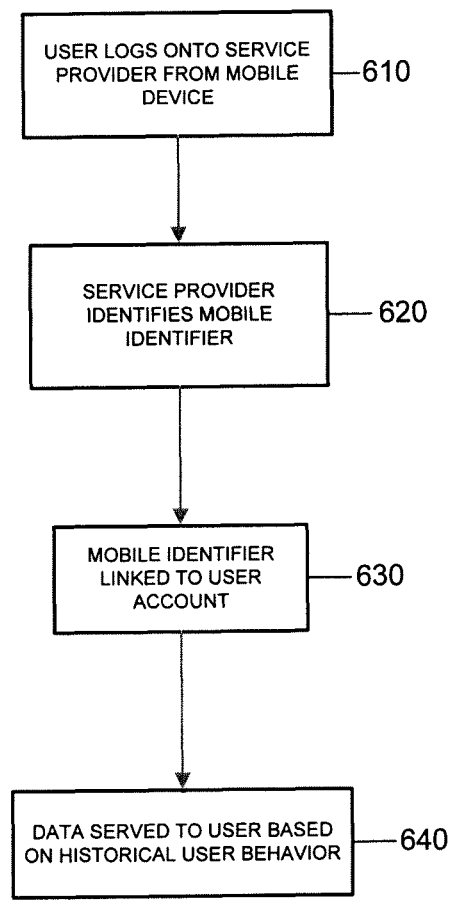
FIG. 6 is a flowchart illustrating the operations of linking mobile behavior to web behavior in the system of FIG. 1, or other systems for targeting data to users on mobile devices.

FIG. 6 is a flowchart illustrating the operations of linking mobile behavior to web behavior in the system of FIG. 1, or other systems for targeting data to users on mobile devices. At block 610 the user A 120A may use a user ID to log onto a service of the service provider 240, such as mobile email, from a mobile device. At block 620 the service provider 240 may parse a mobile identifier 305 of the user A 120A from a mobile request.

At block 630 the service provider server 240 may link the mobile identifier 305 of the user A 120A to the user ID of the user A 120A and thus the historical user behavior data associated with the user ID of the user A 120A. The service provider server 240 may be able to link the mobile identifier 305 of the user A 120A to the user ID of the user A 120A if the user A 120A uses their user ID to access a service of the service provider 130 through their mobile device. The user ID of the user A 120A may be associated with historical user interaction and/or behavior data. Upon linking the mobile identifier 305 to the user ID, the historical data may then be available to use for targeting ads to user A 120A over their mobile device.

At block 640 the service provider server 240 may serve data, such as a mobile advertisement, to the user A 120A based on the historical user behavior data associated with the user ID of the user A 120A. For example, if the historical behavior data associated with the user ID of the user A 120A demonstrates an interest in sports, a sports mobile advertisement may be served to the user A 120A. The historical behavioral data indicating an interest in sports may have been entirely collected from the web interactions of the user A 120A. However, since the mobile identifier 305 has been linked to the user ID of the user A 120A, the web behavioral data may be mined for targeting mobile advertisements.

Figure 7:
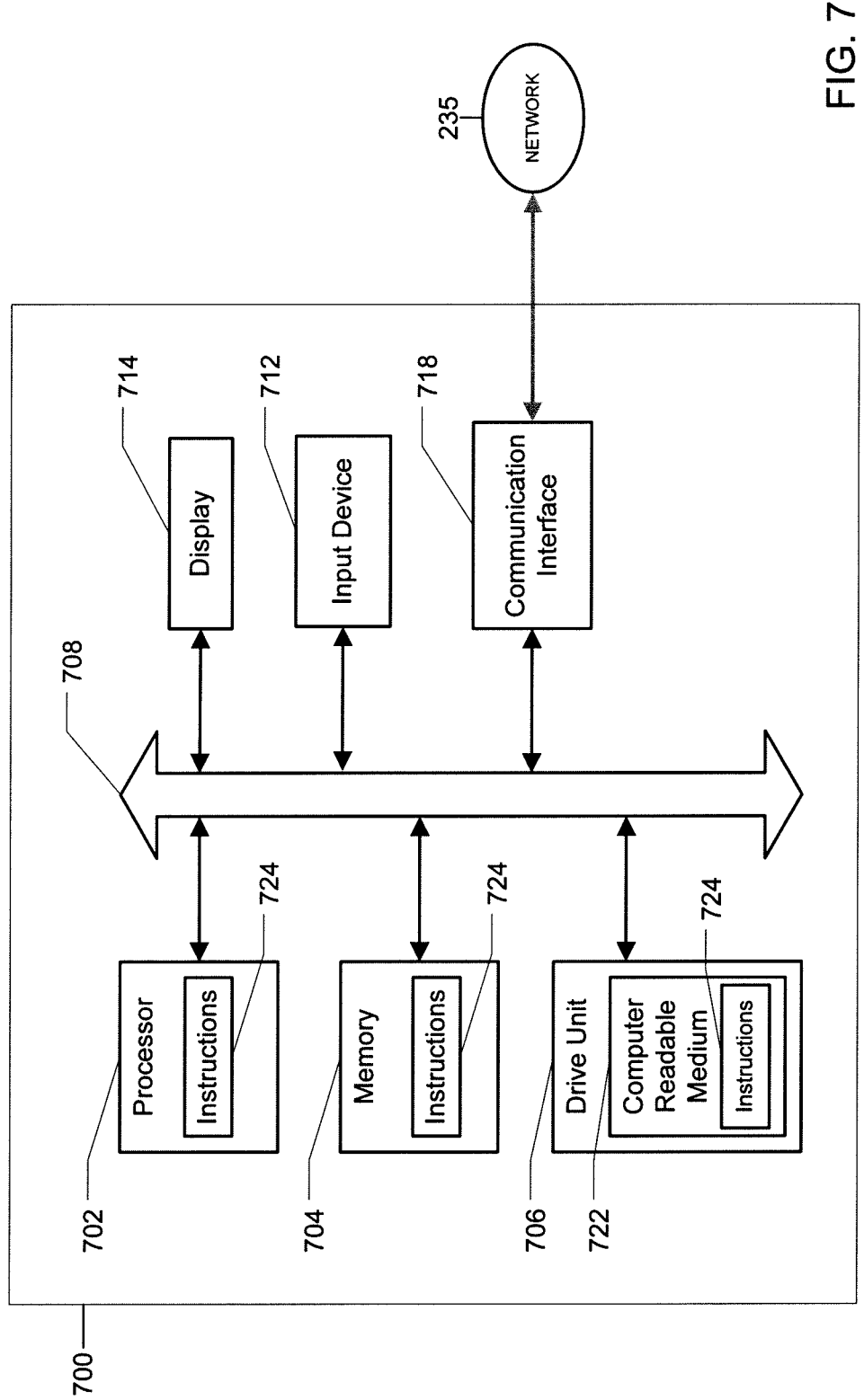
FIG. 7 an illustration a general computer system that may be used in the system of FIG. 1 or other systems for targeting data to users on mobile devices.

FIG. 7 illustrates a general computer system 700, which may represent a service provider server 240, a third party server 250, an advertising services server 260, a mobile device or any of the other computing devices referenced herein. The computer system 700 may include a set of instructions 724 that may be executed to cause the computer system 700 to perform any one or more of the methods or computer based functions disclosed herein. The computer system 700 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 700 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 724 (sequential or otherwise) that specify actions to be taken by that machine. In a particular embodiment, the computer system 700 may be implemented using electronic devices that provide voice, video or data communication. Further, while a single computer system 700 may be illustrated, the term "system" shall also be taken to include any collection of systems or subsystems that individually or jointly execute a set, or multiple sets, of instructions to perform one or more computer functions.

As illustrated in FIG. 7, the computer system 700 may include a processor 702, such as, a central processing unit (CPU), a graphics processing unit (GPU), or both. The processor 702 may be a component in a variety of systems. For example, the processor 702 may be part of a standard personal computer or a workstation. The processor 702 may be one or more general processors, digital signal processors, application specific integrated circuits, field programmable gate arrays, servers, networks, digital circuits, analog circuits, combinations thereof, or other now known or later developed devices for analyzing and processing data. The processor 702 may implement a software program, such as code generated manually (i.e., programmed).

The computer system 700 may include a memory 704 that can communicate via a bus 708. The memory 704 may be a main memory, a static memory, or a dynamic memory. The memory 704 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 704 may include a cache or random access memory for the processor 702. Alternatively or in addition, the memory 704 may be separate from the processor 702, such as a cache memory of a processor, the system memory, or other memory. The memory 704 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 704 may be operable to store instructions 724 executable by the processor 702. The functions, acts or tasks illustrated in the figures or described herein may be performed by the programmed processor 702 executing the instructions 724 stored in the memory 704. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

The computer system 700 may further include a display 714, such as a liquid crystal display (LCD), an organic light emitting diode (OLED), a flat panel display, a solid state display, a cathode ray tube (CRT), a projector, a printer or other now known or later developed display device for outputting determined information. The display 714 may act as an interface for the user to see the functioning of the processor 702, or specifically as an interface with the software stored in the memory 704 or in the drive unit 706.

Additionally, the computer system 700 may include an input device 712 configured to allow a user to interact with any of the components of system 700. The input device 712 may be a number pad, a keyboard, or a cursor control device, such as a mouse, or a joystick, touch screen display, remote control or any other device operative to interact with the system 700.

The computer system 700 may also include a disk or optical drive unit 706. The disk drive unit 706 may include a computer-readable medium 722 in which one or more sets of instructions 724, e.g. software, can be embedded. Further, the instructions 724 may perform one or more of the methods or logic as described herein. The instructions 724 may reside completely, or at least partially, within the memory 704 and/or within the processor 702 during execution by the computer system 700. The memory 704 and the processor 702 also may include computer-readable media as discussed above.

The present disclosure contemplates a computer-readable medium 722 that includes instructions 724 or receives and executes instructions 724 responsive to a propagated signal; so that a device connected to a network 235 may communicate voice, video, audio, images or any other data over the network 235. Further, the instructions 724 may be transmitted or received over the network 235 via a communication interface 718. The communication interface 718 may be a part of the processor 702 or may be a separate component. The communication interface 718 may be created in software or may be a physical connection in hardware. The communication interface 718 may be configured to connect with a network 235, external media, the display 714, or any other components in system 700, or combinations thereof. The connection with the network 235 may be a physical connection, such as a wired Ethernet connection or may be established wirelessly as discussed below. Likewise, the additional connections with other components of the system 700 may be physical connections or may be established wirelessly. In the case of a service provider server 240, a third party server 250, an advertising services server 260, the servers may communicate with users 120A-N and the revenue generators 110A-N through the communication interface 718.

The network 235 may include wired networks, wireless networks, or combinations thereof. The wireless network may be a cellular telephone network, an 802.11, 802.16, 802.20, or WiMax network. Further, the network 235 may be a public network, such as the Internet, a private network, such as an intranet, or combinations thereof, and may utilize a variety of networking protocols now available or later developed including, but not limited to TCP/IP based networking protocols.

The computer-readable medium 722 may be a single medium, or the computer-readable medium 722 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 722 may include a solid-state memory such as a memory card or other package that houses one or more non-volatile read-only memories. The computer-readable medium 722 also may be a random access memory or other volatile re-writable memory. Additionally, the computer-readable medium 722 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method for targeting data to users on mobile devices, comprising:
   determining a mobile identifier from a first request of a user on a mobile device, wherein the mobile identifier uniquely identifies requests received from the user on the mobile device;
   mapping the mobile identifier to a session identifier, upon determining the mobile identifier from the first request;
   collecting a mobile user behavior dataset describing mobile behavior of the user operating the mobile device wherein at least a portion of the behavior of the user is identified by extracting the mobile identifier from each subsequent request received from the mobile device of the user and identifying the session identifier mapped thereto;

storing data of the mobile user behavior dataset in a mobile behavior data store;

collecting a user behavior dataset describing a behavior of the user on a plurality of platforms other than the mobile device;

storing data of the user behavior dataset in a web behavior data store;

identifying a user identifier of the user of the mobile device;

subsequently, merging the data of the mobile user behavior dataset and the data of the user behavior dataset to form a merged user behavior dataset;

storing the merged user behavior data set in a merged user behavior store; and using the user identifier of the user of the mobile device, serving data to the user on the mobile device and on at least one other of the plurality of platforms based on the merged user behavior dataset;

if the user identifier of the user of the mobile device cannot be identified, serving data to the user on the mobile device based only on the mobile user dataset describing the mobile behavior of the user operating the mobile device.

2. The method of claim 1 wherein serving data comprises serving data defining a mobile advertisement.

3. The method of claim 1 wherein the mobile identifier comprises a phone number of the mobile device.

4. The method of claim 1 wherein the session identifier comprises a cookie.

5. The method of claim 1 wherein the mobile identifier comprises a string of characters.

6. The method of claim 1 further comprising applying a behavior targeting mechanism to the dataset to identify the data to serve.

7. A method for serving advertisements over mobile devices, comprising:

extracting a mobile identifier from a request of a user on a mobile device, wherein the mobile identifier identifies requests received from the user through the mobile device separate from other requests received from the user;

collecting data about behavior of the mobile device and storing the collected mobile behavior data in a mobile behavior data store;

determining if a user identifier used by the user to access one or more online services may be determined, wherein the user identifier is distinct from the mobile identifier and associated with a user dataset describing a historical online behavior of the user, the user dataset being stored in a web behavior data store;

if the user identifier may be determined, linking the mobile identifier to the user dataset and the user identifier and merging mobile behavior data from the mobile behavior data store with the user dataset from the web behavior data store to form merged user behavior data stored in a user behavior store; and serving an advertisement to the user based on the merged user behavior data stored in the user behavior data upon receiving a subsequent request comprising the mobile identifier, and if the user identifier may not be determined, serving an advertisement to the user based only on user behavior data associated with a device dataset describing a historical online behavior of the mobile device.

8. The method of claim 7 wherein the advertisement comprises a mobile advertisement.

9. The method of claim 8 wherein the advertisement is served as a part of an SMS message.

10. The method of claim 7 wherein the mobile identifier is appended to the mobile request by a mobile network operator.

11. The method of claim 7 wherein determining if a user identifier of the user may be determined comprises:

identifying a mobile phone number associated with the mobile device;

matching the mobile phone number to a phone number associated with the user identifier; and linking the mobile identifier to the user identifier.

12. A method for serving advertisements over mobile devices, comprising:

determining a mobile identifier which identifies requests received from a user on a mobile device through a mobile network operator gateway separate from other requests received from the user;

collecting mobile behavior data about behavior of the mobile device and storing the collected mobile behavior data in a mobile behavior data store;

determining a web identifier which identifies the other requests received from the user on devices other than the mobile device, wherein the web identifier is distinct from the mobile identifier and associated with a web dataset describing previous web interactions with the user the web dataset being stored in a web behavior data store;

if the collected mobile behavior data identifies the user with the web identifier, linking the mobile identifier to the web identifier and merging mobile behavior data from the mobile behavior data store with the web dataset from the web behavior data store to form merged user behavior data stored in a user behavior store;

retrieving an advertisement based on the merged user behavior data;

if the collected mobile behavior data does not identify the user with the web identifier, retrieving an advertisement based only on the collected mobile behavior data; and serving the retrieved advertisement to the user through the mobile network operator gateway, upon receiving a subsequent request comprising the mobile identifier.

13. The method of claim 12 further comprising:

storing interactions with the user through the mobile network operator gateway in the merged user behavior data;

receiving a second request from the user, the second request independent of the mobile network operator gateway;

retrieving a second advertisement based on the interactions with the user through the mobile network operator gateway; and providing the second advertisement to the user in response to the second request.

14. The method of claim 12 wherein the mobile identifier is received from a mobile network operator.

15. The method of claim 12 wherein the retrieved advertisement is retrieved using a behavior targeting mechanism.

16. The method of claim 12 further comprising:

determining, based on the subsequent request, a user identifier used by the user to access one or more online services, wherein the user identifier is associated with a second dataset describing a historical behavior of the user;

linking the mobile identifier, the web identifier and the user identifier;

retrieving a second advertisement based on the historical behavior of the user; and providing the second advertisement to the user in response to the subsequent request.

17. A system for targeting data to users on mobile devices, comprising:
a memory to store a request, a mobile identifier, a session identifier, a mobile user dataset stored in a mobile behavior store, the mobile user dataset describing user behavior of a user on a mobile device, a user behavior dataset stored in a web behavior data store, the user behavior dataset describing a behavior of a user on a plurality of platforms other than the mobile device, and a merged user behavior dataset;
an interface operatively connected to the memory to communicate with a user on the mobile device; and
a processor operatively connected to the memory and the interface, the processor operating in response to stored data and instructions, wherein the processor receives the request from the user on the mobile device via the interface, determines the mobile identifier from the request, wherein the mobile identifier uniquely identifies requests received from the user on the mobile device, maps the mobile identifier to the session identifier, upon determining the mobile identifier from the request, collects the mobile user behavior dataset using the session identifier and stores the mobile user behavior dataset in the mobile behavior store, the mobile user behavior dataset describing mobile behavior of the user on the mobile device, wherein at least a portion of the mobile behavior of the user is identified by extracting the mobile identifier from each subsequent request received from the mobile device of the user, and wherein the processor determines if the user is identifiable, and if the user is identifiable, the processor merges the mobile user behavior dataset and the user behavior dataset to form the merged user behavior dataset, and serves data to the user based on the merged user behavior dataset via the interface, and if the user is not identifiable, serves data to the user based only on the mobile user behavior dataset via the interface.

18. The system of claim 17 wherein the processor serves data comprising a mobile advertisement.

19. The method of claim 18 wherein the served data is retrieved from a data source using the user behavior dataset with a behavior targeting system.

20. The system of claim 17 wherein the session identifier comprises a cookie.

21. The system of claim 17 wherein the mobile device comprises a mobile phone.

22. The system of claim 17 wherein the interface communicates to the mobile device via a mobile network operator.

* * * * *